United States Patent [19]

De Rudder

[11] Patent Number: 5,424,361
[45] Date of Patent: Jun. 13, 1995

[54] LOW TEMPERATURE IMPACT RESISTANT POLYCARBONATE/POLY(CYCLOHEXANEDIMETHYLENE TEREPHTHALATE)/CORE SHELL ACRYALTE COPOLYMER COMPOSITIONS

[75] Inventor: James L. De Rudder, Mt. Vernon, Ind.

[73] Assignee: General Electric Company, Pittsfield, Mass.

[21] Appl. No.: 845,749

[22] Filed: Mar. 2, 1992

Related U.S. Application Data

[63] Continuation of Ser. No. 590,497, Sep. 26, 1990, abandoned, which is a continuation of Ser. No. 947,671, Dec. 30, 1986, abandoned.

[51] Int. Cl.$^6$ ............................................. C08L 69/00
[52] U.S. Cl. ........................................ 525/67; 525/64; 524/424
[58] Field of Search ........................... 525/67; 524/424

[56] References Cited

U.S. PATENT DOCUMENTS

| | | | |
|---|---|---|---|
| 4,180,494 | 12/1979 | Fromuth | 525/67 |
| 4,188,314 | 2/1980 | Fox | 525/433 |
| 4,257,937 | 3/1981 | Cohen et al. | 260/40 R |
| 4,264,487 | 4/1981 | Fromuth | 525/67 |
| 4,320,212 | 3/1982 | Liu | 525/148 |
| 4,391,954 | 7/1983 | Scott | 525/439 |
| 4,536,538 | 8/1985 | Liu | 524/508 |
| 4,604,423 | 8/1986 | Liu | 525/508 |
| 4,629,760 | 12/1986 | Liu | 525/67 |

FOREIGN PATENT DOCUMENTS

| | | | |
|---|---|---|---|
| 0079477 | 3/1983 | European Pat. Off. | C08L 67/02 |
| 0107048 | 5/1984 | European Pat. Off. | C08L 69/00 |
| 0132339 | 1/1985 | European Pat. Off. | C08L 69/00 |
| 0135779 | 4/1985 | European Pat. Off. | |
| 61-26166 | 10/1986 | Japan. | |

*Primary Examiner*—Patricia A. Short

[57] ABSTRACT

Improved thermoplastic compositions exhibiting high impact strength at −30° C. and below comprising (a) an aromatic polycarbonate, (b) a polyester resin derived from a cyclohexanedimethanol and a hexacarbocyclic dicarboxylic acid, and (c) an impact modifier comprising a core-shell multi-stage polymer. The compositions are useful to make molded articles requiring high impact strength at low temperatures and low net rubber contents.

1 Claim, No Drawings

LOW TEMPERATURE IMPACT RESISTANT POLYCARBONATE/POLY(CYCLOHEXANEDIMETHYLENE TEREPHTHALATE)/CORE SHELL ACRYALTE COPOLYMER COMPOSITIONS

This is a continuation of application Ser. No. 07/590,497 filed Sep. 26, 1990, now abandoned, which is a continuation of application Ser. No. 06/947,671 filed Dec. 30, 1986, now abandoned.

This invention relates to modified thermoplastic compositions that are useful to make moldable articles of improved low temperature impact strength. More particularly, the invention pertains to compositions of (a) an aromatic polycarbonate resin, and (b) a polyester resin derived from a cyclohexanedimethanol and a hexacarbocyclic dicarboxylic acid and (c) an effective amount of an impact modifier comprising a core-shell acrylate (co-)polymer.

BACKGROUND OF THE INVENTION

Impact modified thermoplastic compositions of polycarbonate (PC) combined with polyester resins have been disclosed. For example, in Liu, U.S. Pat. No. 4,536,538, impact-modified polycarbonate compositions comprising an impact modifier of poly(cyclohexanedimethylene iso- and terephthalate) and an olefin-acrylate copolymeric resin, e.g., ethylene ethyl acrylate are disclosed. The compositions of patent '538 are said to have increased thick section impact in comparison to polycarbonate alone. In European Patent Application 132339 (published Jan. 30, 1985), there are disclosed thermoplastic resin compositions comprising pigmented polyester, e.g., poly (1,4-butylene terephthalate) resins (PBT), and/or aromatic polycarbonate resins having a multi-stage polymeric impact-modifier of styrenic monomer, crosslinking monomer and optionally, non-styrenic non-crosslinking monomer. In Cohen et al., U.S. Pat. No. 4,257,937, thermoplastic PBT resin compositions are impact-modified by a combination of a polyacrylate resin, e.g., n-butyl acrylate and an aromatic polycarbonate, e.g., poly(bisphenol-A carbonate). In European Patent Application 33993 (published Mar. 13, 1985), are disclosed thermoplastic molding compositions comprised of PBT, an aromatic polycarbonate, e.g., poly(bisphenol-A carbonate) and a modifier combination comprising an acrylate/methacrylate core-shell graft copolymer resin and a polyolefin or an olefinic copolymer. In European Patent Application 107,048, are described thermoplastic blends of an aromatic polycarbonate, poly(ethylene terephthalate) (PET), and an acrylate-based rubbery core (meth)acrylate outer shell multi-stage polymer.

PC/polyester compositions have also been modified in order to improve their resistance to low temperature impacts. For example, in European Patent Application 79,477 (published May 25, 1983), and in Liu, U.S. Pat. No. 4,320,212, are disclosed modified thermoplastic polyester compositions which comprise PBT or a block PBT copolymer, optionally blended with PET and an impact modifying combination of a core-shell polymer having a rubbery conjugated dienic polymer core and a polymerized (meth)acrylate shell, optionally with an aromatic polycarbonate. The compositions of the '477 EPO Patent Application are described as having enhanced resistance to low temperature impact fracture, but still greater impact resistance at temperatures below −30° C., and even at −51° C. would be desirable.

It has now been unexpectedly discovered that thermoplastic compositions comprising polycarbonates and poly(cyclohexanedimethylene arylates) demonstrate excellent impact strength at low temperatures when modified by a multi-stage polymer having a rubbery core and an outer shell comprising polymerized (meth)acrylate. Moreover the impact strength levels attained have never before been seen with such low levels of rubber content in any known composition of the polyester type.

SUMMARY OF THE INVENTION

Provided in accordance with the present invention are improved thermoplastic molding compositions exhibiting improved impact strength at temperatures of about −30° C. and below, said compositions comprising, in physical admixture:
(a) an aromatic polycarbonate, and
(b) a polyester resin, and
(c) an effective amount of an impact modifier comprising a core-shell multi-stage polymer having a rubbery core and a (meth)acrylate (co-)polymer outer shell, the improvement comprising said composition containing as component (b) a polyester resin derived in main proportion from cyclohexanedimethanol and a hexacarbocyclic dicarboxylic acid.

Also provided are compositions as defined above wherein said impact modifier (c) is present in an amount of from about 1.0 to about 50 parts by weight per 100 parts by weight of (a), (b) and (c) combined.

Contemplated by this invention are compositions as described above wherein said impact modifier comprises a composition as defined wherein said resin (c) comprises a core-shell multi-stage polymer having a rubbery core derived from n-butyl acrylate, butadiene or a mixture thereof, and a (meth)acrylate (co-)polymer outer shell.

Also contemplated are compositions which also include (a) a reinforcing amount of a reinforcing agent, e.g., carbon fibers.

DETAILED DESCRIPTION OF THE INVENTION

With respect to component (a), this can comprise aromatic polycarbonate resins, which can be made by those skilled in this art or can be obtained from a variety of commercial sources. They may be prepared by reacting a dihydric phenol with a carbonate precursor, such as phosgene, a haloformate or a carbonate ester. Typically, they will have recurring structural units of the formula:

wherein A is a divalent aromatic radical of the dihydric phenol employed in the polymer producing reaction. Preferably, the aromatic carbonate polymers have an intrinstic viscosity ranging from 0.30 to 1.0 dl./g. (measured in methylene chloride at 25° C.). By dihydric phenols is meant mononuclear or polynuclear aromatic compounds containing two hydroxy radicals, each of which is attached to a carbon atom of an aromatic nucleus. Typical dihydric phenols include 2,2-bis-(4- hydroxyphenyl)propane; 2,2-bis-(3,5-dimethyl-4-hydroxyphenyl)propane; 4,4'-dihydroxydiphenyl ether, bis(2-hydroxyphenyl)methane, mixtures thereof and the like. The preferred aromatic carbonate polymer for component (a) is a homopolymer derived from 2,2-bis(4-hydroxy-phenyl)propane (bisphenol-A).

The term polycarbonates is also intended to embrace polyesterpolycarbonate (PCC). The PCC's for use in the invention are known and some can be obtained commercially. Generally, they are copolyesters comprising recurring carbonate groups:

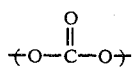
(II)

carboxylate groups:

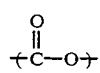
(III)

and aromatic carbocyclic groups in the linear polymer chain, in which at least some of the carboxylate groups and at least some of the carbonate groups are bonded directly to ring carbon atoms of the aromatic carbocyclic groups. These poly(ester-carbonate) copolymers, in general, are prepared by reacting a difunctional carboxylic acid, such as phthalic acid, isophthalic acid, terephthalic acid, homophthalic acid, o-, m-, and p-phenylenediacetic acid, 2,6-naphthalene dicarboxylic acid, mixtures of any of the foregoing, and the like with a dihydric phenol and a carbonate precursor, of the types described above. A particularly useful polyester carbonate is derived from bisphenol-A, isophthalic acid, terephthalic acid, or a mixture of isphthalic acid and terephthalic acid, or the reactive derivatives of these acids such as terephthaloyl di-chloride, isophthaloyl dichloride, or a mixture thereof, and phosgene. The molar proportions of dihydroxy diaryl units to benzenedicarboxylate units to carbonate units can range from 1:0.2–1.00:0.80–0.00 and the molar range of terephthalate units to isophthalate units can range from 99:1 to 1:99 in this preferred family of resins. When the molar proportion of carbonate units is 0, the resin is a wholly aromatic polyester. See Robeson, U.S. Pat. No. 4,286,075.

Aromatic dihydric phenol sulfone resins can also be used as component (a). These comprise a family of resins which can be made by those skilled in this art. For example homopolymers of dihydric phenol, and a dihydroxydiphenyl sulfone and a carbonate precursor can be prepared as well as copolymers of a dihydric phenol and a carbonate precursor can be made according to the description in Schnell, et al., U.S. Pat. No. 3,271,367. A preferred material is made by polymerizing bis(3,5-dimethy14-hydroxy phenyl)sulfone, alone, or especially in combination with bisphenol A with a phosgene or a phosgene precursor, in accordance with the description in Fox, U.S. Pat. No. 3,737,409. Especially preferred is a copolymer made by reacting 1-99, preferably 40-99 wt. percent of the sulfone, 99 to 1, preferably 1 to 60 wt. percent of the bisphenol with phosgene.

The polyesters (b) derived from cyclohexanedimethanol are prepared by condensing either the cis- or transisomer (or a mixture thereof) of, for example, 1,4-cyclohexanedimethanol with a hexacarbocyclic dicarboxylic acid so as to produce a polyester having recurring units having the following formula:

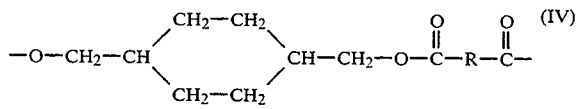
(IV)

wherein the substituted cyclohexane ring is selected from the group consisting of the cis- and trans-isomers thereof and R represents an organic radical containing from 6 to 20 carbon atoms which is the decarboxylated residue derived from a hexacarbocyclic dicarboxylic acid.

The preferred polyester resins may be derived from the reaction of a mixture of the cis- and trans-isomers of 1,4-cyclohexanedimethanol with a mixture of iso- and terephthalic acids. These polyesters have recurring units of the formula:

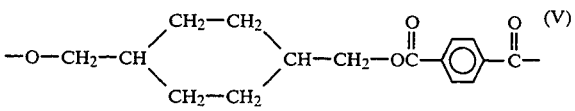
(V)

These polyesters can be produced by well known methods in the art such as those set forth in U.S. Pat. No. 2,901,466. The poly( 1,4-cyclohexanedimethanol terephthalate) is commercially available.

Of course, it is understood that the polyester resins of this invention can be prepared by condensing 1,4-cyclohexanedimethanol and minor amounts of other bifunctional glycols with the hexacarbocyclic dicarboxylic acid. These other bifunctional glycols include the polymethylene glycols containing from 2 to 10 or more carbon atoms such as ethylene glycol, butylene glycol, etc.

Examples of hexacarbocyclic dicarboxylic acids wherein the carboxy radicals are attached in para relationship to a hexacarbocyclic residue indicated by R in formula (IV) include terephthalic acid, trans-hexahydroterephthalic acid, p,p'-sulfonyldibenzoic acid, 4,4'-diphenic acid, 4,4'-benzophenonedicarboxylic acid, 1,2-di(p-carboxyphenyl)ethane, 1,2-di(p-carboxyphenyl)ethene, 1,2-di(p-carboxyphenoxy)ethane, 4,4'-dicarboxydiphenyl ether, etc. and mixtures of these. All of these acids contain at least one hexacarbocyclic nucleus. Fused rings can also be present such as in 1,4-, 1,5- or 2,6-napthalenedicarboxylic acid. The hexacarbocyclic dicarboxylic acids are preferably those containing a transcyclohexane nucleus or an aromatic nucleus containing from one to two benzene rings of which at least one has the usual benzenoid unsaturation. Of course, either fused or attached rings can be present. All of the compounds named in this paragraph come within the scope of this preferred group. The preferred dicarboxylic acid is terephthalic acid.

These polyesters should have an intrinsic viscosity between 0.40 and 2.0 dl./g. measured in a 60/40 phenol-tetrachloroethane solution or a similar solvent at 25°–30° C. Especially preferred polyesters will have an intrinsic viscosity in the range of 0.5 and 1.2 dl./g.

The quantity of polycarbonate (a) and the polyester (b) is not critical to this invention and can vary widely. In general, the amount of polycarbonate (a) will exceed the amount of the polyester (b). The ratio of polycarbonate (a) to polyester (b) can range from 10:1 to 1:1, preferably 4:1 to 1.5:1.

Impact modifier (c) comprises core-shell rubber core poly(meth)acrylate outer shell polymers. The resins (c) can be made in known ways and they are available from a number of sources, e.g., Rohm & Haas Company, Philadephia, U.S.A., under the trade designations Acryloid, KM330 and KM653. Acryloid ® KM330 is a core shell polymer comprising 60/40 methyl methacrylate shell/n-butyl acrylate polymer core. Other useful multistage polymers are available from the Kanagafuchi Co., Japan. In general, any of the polyalkyl (meth)acrylates described in Brinkmann et al., U.S. Pat. No. 3,591,659 can be used, especially those containing units derived from n-butyl acrylate. Preferably, the polyacrylate resin will be in the form of a rubber-elastic graft copolymer having a glass transition temperature below 20° C. as described in Schlichting et al., U.S. Pat. No. 4,022,748. Especially preferably, the polyacrylate will comprise a multiple stage polymer having a rubbery first stage and a thermoplastic hard final stage, as described in Farnham et al., U.S. Pat. No. 4,096,202, and Avakian et al., U.S. Pat. No. 4,587,272, incorporated herein by reference.

The polyacrylate impact-modifier described above, e.g., KM ®330 or KM ®653, can be added to the other resinous components (a) and (b) in a concentrate form, e.g., in ethylene ethyl acrylate copolymer resins.

Impact modifier (c) may, as mentioned, also comprise an acrylic or methacrylic monomer grafted polymer of a conjugated diene alone or copolymerized with a vinyl aromatic compound. Preferably, the core shell polymers of the type available from Rohm & Haas under the trade designation ACRYLOID KM ® 653 are used, especially those containing units derived from butadiene or isoprene, alone or in combination with a vinyl aromatic compound. These are described in Fromuth et al., U.S. Pat. No. 4,780,494. Especially preferably, the copolymer component (c) will comprise a three stage polymer having a butadienebased rubbery core, a second stage polymerized from styrene and a final stage or shell polymerized from methyl methacrylate and 1,3-butylene glycol dimethacrylate.

The amount of the impact modifier (c) can also vary widely. It has been found that even relatively minor amounts of the modifier (c) are effective in providing significant improvements in impact strength over a range of low temperatures. In general, however, the impact modifier (c) will be present in amounts of at least about 1% by weight, preferably from about 2.5 to about 50% by weight of (a) and (b).

The compositions of this invention can be prepared by a number of procedures. In one way, the modifier and, optionally, reinforcing agent, e.g., glass, mica, or carbon fiber and/or fire retardants, and stabilizers, is put into an extrusion compounder with resinous components to produce molding pellets. The modifier and other ingredients are dispersed in a matrix of the resin in the process. In another procedure, the modifier and any reinforcing agent and/or flame retardants and/or stabilizers are mixed with the resins by dry blending, and then are extruded and chopped. The modifying agent and any other ingredients can also be mixed with the resins and directly molded, e.g, by injection or transfer molding techniques.

It is always important to thoroughly free all of the ingredients; resin, modifier, reinforcement and/or filler, flame retardants and any optional, conventional additives from as much water as possible.

In addition, compounding should be carried out to ensure that the residence time in the machine is short; the temperature is carefully controlled; the friction heat is utilized; and an intimate blend between the resin and the modifier and any other ingredients is obtained.

Although it is not essential, best results are obtained if the ingredients are pre-compounded, pelletized and then molded. Pre-compounding can be carried out in conventional equipment. For example, after carefully pre-drying the polyester and modifier, e.g., for four hours at 121° C., a single screw extruder is fed with a dry blend of the ingredients, the screw employed having a long transition section to ensure proper melting. On the other hand, a twin screw extrusion machine, e.g., a 53 mm Werner Pfleiderer machine can be fed with resin and additives at the feed port and reinforcement downstream. In either case, a generally suitable machine temperature will be about 200° C. to 260° C., resulting in a melt temperature of 235° C. to 350° C.

The pre-compounded composition can be extruded and cut up into molding compounds such as conventional granules, pellets, etc., by standard techniques.

The composition can be molded in any equipment conventionally used for thermoplastic compositions, e.g., a Van Dorn type injection molding machine with conventional cylinder temperatures, e.g., 216°-288° C., and conventional mold temperatures, e.g., 54°-93° C.

Other conventional ingredients, such as pigments and dyes, stabilizers, antioxidants, mold release agents, ultraviolet stabilizers, mineral fillers, and the like can be added in conventional amounts.

DESCRIPTION OF THE PREFERRED EMBODIMENTS

The following examples are set forth herein to illustrate in more detail the preferred embodiments and to illustrate more clearly the principle and practice of this invention to those skilled in the art. These examples are not to be construed to limit the claims in any manner whatsoever.

Formulations were compounded by dry blending the components followed by extrusion on a vented, one inch single screw Haake Buchler extruder with a length/diameter ratio of 25. Generally, the polycarbonate powder was not dried prior to extrusion. The extrusion parameters was done at 560° F. set temperature and a 568° F. melt temperature, at 100 rpm screw speed and 40 amps power.

After drying, the material was molded into standard ASTM Testing bars. Injection molding was carried out at 560° F. barrel temperature, 150° F. mold temperature, 40 second cycle time, and using a 75 ton Van Dorn molding machine.

For testing, the procedure of American Society of Testing Materials (ASTM D-256) was used on unnotched Izod bars. The DTUL Test Distortion Temperature Under Load, was performed according to ASTM D648.

EXAMPLES 1-3

Compositions comprising an aromatic polycarbonate, poly(cyclohexanedimethylene terephthalate), a (meth)acrylic multi-stage impact modifier, and minor amounts of conventional additives for mold release and stabilization were formulated, molded into workpieces and tested. The formulations used and the results obtained are set forth in Table 1.

TABLE 1

Impact-Modified PC/PCT Molding Compositions

|  | Example 1 | Example 2 | Example 3 |
|---|---|---|---|
| Composition (parts by weight) | | | |
| Poly(bisphenol-A carbonate) | 71.12 | 71.6 | 71.2 |
| Poly(cyclohexanedimethylene terephthalate) | 21.3 | 21.3 | 21.3 |
| Multi-stage (meth)acrylate (concentrate)[a] | 6.6 | — | — |
| Multi-stage (meth)acrylate (powder)[b] | — | 6.6 | — |
| Multi-stage (meth)acrylate (powder)[c] | — | — | — |
| Stabilizers and mold release | 0.5 | 0.5 | 1.5 |
| Properties | | | |
| Notched Izod, 25° C., ft. lb./in. | 18.88 | 16.5 | 15.9 |
| Notched Izod, 15° C., ft. lb./in. | 17.5 | — | — |
| Notched Izod, 0° C., ft. lb./in. | 17.2 | 15.0 | 16.3 |
| Notched Izod, −30° C., ft. lb./in. | 14.7 | 13.9 | 13.6 |
| Notched Izod, −40° C., ft. lb./in. | — | 6.69 | 12.4 |
| Notched Izod, −50° C., ft. lb./in. | — | 6.18 | 10.9 |
| DTUL @ 264 psi, °F. | 248 | 270 | 268 |

[a] KM ® 330/EEA Concentrate, Rohm and Haas Company
[b] KM ® 330, Rohm and Haas Company, rubbery n-butyl acrylate core
[c] KM ® 653, Rohm and Haas Company, rubbery poly butadiene core The results indicate that excellent low temperature impact resistance is obtained with these compositions. The composition in which the impact modifier comprises a polybutadiene core is especially outstanding (Example 3). Both Examples 2 and 3 have high heat resistance.

Additional tests have shown that the compositions of Examples 2 and 3 are both relatively easily flowable materials in the mold. The composition of Example 2 is outstanding in terms of good thermal stability and aging resistance.

EXAMPLES 4–7

The general procedure of Example 1–3 is repeated making compositional adjustments. The formulations used and the results obtained are set forth in Table 2:

TABLE 2

Impact-Modified PC/PCT Molding Compositions

|  | Example 4A* | 4 | 5 | 6 | 7 |
|---|---|---|---|---|---|
| Composition (parts by weight) | | | | | |
| Poly(bisphenol-A carbonate) | 76.7 | 74.1 | 71.6 | 69.0 | 65.2 |
| Poly(1,4-cyclohexane-dimethanol terephthalate) | 22.8 | 22.0 | 21.3 | 20.5 | 19.3 |
| Multi-stage rubbery n-butyl acrylate core, methyl methacrylate shell | 0 | 3.3 | 6.6 | 10.0 | 15.0 |
| Stabilizers and mold release | 0.5 | 0.5 | 0.5 | 0.5 | 0.5 |
| Properties | | | | | |
| Notched Izod. ft.-lbs./in. | | | | | |
| at −30° C. | 2.6 | 14.4 | 14.9 | 13.8 | 12.7 |
| at −48° C. | 2.3 | 8.4 | 10.3 | 10.2 | 11.2 |
| Heat Distortion Temp., °F. at 264 psi | 246 | 248 | 246 | 244 | 238 |

*Control

The low temperature impact strength is retained even at relatively low rubber contents.

EXAMPLES 8–11

The general procedure of Example 1–3 is repeated making use of a polyester polycarbonate comprising units derived of bisphenol-A, isophthalic acid, terephthalic acid and phosgene (Hipec PPC). The formulations used and the results obtained are set forth in Table 3:

TABLE 3

Impact-Modified PPC/PCT Molding Compositions

|  | Example 8 | 9 | 10 | 11 |
|---|---|---|---|---|
| Composition (parts by weight) | | | | |
| Poly(bisphenol-A iso-/tere-phthalate/carbonate) | 69.1 | 54.9 | 65.2 | 51.0 |
| Poly(1,4-cyclohexane-dimethanol terephthalate) | 21.3 | 36.0 | 21.3 | 36.0 |
| Multi-stage core-shell polymer of n-butyl acrylate/methyl methacrylate[a] concentrate in ethylene ethyl acrylate copolymer (80:20 w/w) | 6.6 | 6.6 | 10.5 | 10.5 |
| Additives for stabilization and mold release | 0.5 | 0.5 | 0.5 | 0.5 |
| Properties | | | | |
| R.T. Notched Izod, ft. lbs./in. | 14.6 | 14.6 | 12.2 | 13.0 |
| −30° C. | 7.4 | 7.6 | 8.4 | 10.0 |
| Heat Distortion Temperature, °F. at 264 psi | 268 | 252 | 264 | 250 |

[a] ACRYLOID ® KM330

Compositions according to this invention having high heat resistance and impact resistance are obtained.

EXAMPLE 12

The general procedure of Example 8–11 is repeated substituting a butadiene core multi-stage impact modifier. The formulations used and the results obtained are set forth in Table 4:

TABLE 4

Impact-Modified PPC/PCT Molding Compositions

|  | Example 12 |
|---|---|
| Composition (parts by weight) | |
| Poly(bisphenol-A iso-/terephthalate/carbonate) | 71.3 |
| Poly(1,4-cyclohexanedimethanol terephthalate) | 21.3 |
| Multi-stage core-shell polymer of n-butyl acrylate/methyl methacrylate[a] | 6.6 |
| Additives for stabilization and mold release | 0.5 |
| Properties | |
| R.T. Notched Izod, ft. lbs./in. | 15.9 |
| −30° C. | 13.6 |
| Heat Distortion Temperature, °F. at 264 psi | 268 |

[a] ACRYLOID ® KM653

A composition according to this invention having high heat resistance and exceptionally good low temperature impact resistance is obtained.

The foregoing patents, applications, and test methods are incorporated herein by reference. Many variations will suggest themselves to those skilled in this art in light of the above detailed description. Other conventional additives can be added in conventional amounts, such as pigments and dyes, UV stabilizers, mold release agents, flame retardants, glass, carbon and mineral fillers and/or reinforcements and the like. All such obvious variations are within the full intended scope of the attached claims.

I claim:

1. An improved thermoplastic molding composition exhibiting improved impact strength at temperatures of about −30° C. and lower, said composition consisting essentially of in physical admixture:
   (a) from 65 to 77 weight percent of an aromatic polycarbonate,
   (b) from 19 to 23 weight percent of a polyester resin derived in major proportion from cyclohexanedimethanol and a hexacarbocyclic dicarboxylic acid, and
   (c) from 3 to 15 weight percent of an impact modifier consisting essentially of a core-shell multi-stage polymer having a rubbery core consisting essentially of units derived from n-butyl acrylate and an outer shell consisting essentially of (meth)acrylate (co)polymer.

* * * * *